(12) United States Patent
Yonak et al.

(10) Patent No.: US 10,204,729 B2
(45) Date of Patent: Feb. 12, 2019

(54) INDUCTOR COOLING SYSTEMS AND METHODS

(71) Applicant: Ford Global Technologies, LLC, Dearborn, MI (US)

(72) Inventors: Serdar Hakki Yonak, Ann Arbor, MI (US); Kevin Lloyd Newman, Farmington Hills, MI (US); Vincent Skalski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 15/343,668

(22) Filed: Nov. 4, 2016

(65) Prior Publication Data

US 2018/0130589 A1 May 10, 2018

(51) Int. Cl.
| | |
|---|---|
| *H01F 27/10* | (2006.01) |
| *H01F 27/08* | (2006.01) |
| *H01F 27/02* | (2006.01) |
| *H01F 27/00* | (2006.01) |
| *F16H 57/04* | (2010.01) |
| *H01F 27/22* | (2006.01) |
| *H01F 27/255* | (2006.01) |
| *H01F 27/28* | (2006.01) |

(Continued)

(52) U.S. Cl.
CPC ....... *H01F 27/008* (2013.01); *F16H 57/0417* (2013.01); *H01F 27/025* (2013.01); *H01F 27/10* (2013.01); *H01F 27/22* (2013.01); *H01F 27/255* (2013.01); *H01F 27/2823* (2013.01); *H01F 27/2895* (2013.01); *B60K 6/365* (2013.01); *B60K 6/44* (2013.01); *B60K 6/547* (2013.01); *B60Y 2200/92* (2013.01); *B60Y 2306/05* (2013.01); *F16H 3/091* (2013.01); *F16H 3/725* (2013.01); *F16H 37/042* (2013.01); *Y10S 903/91* (2013.01); *Y10S 903/919* (2013.01)

(58) Field of Classification Search
CPC ........ H01F 3/14; H01F 27/008; H01F 27/025; H01F 27/10; H01F 27/22; H01F 27/2823; H01F 27/2895; H01F 27/255; H01F 27/08; H01F 14/062; H16H 57/0417; H16H 37/042
USPC .................. 336/90, 57, 58, 61, 212, 178
See application file for complete search history.

(56) References Cited

U.S. PATENT DOCUMENTS

| | | |
|---|---|---|
| 3,176,175 A | 3/1965 | Jaeschke |
| 5,684,380 A | 11/1997 | Woody et al. |

(Continued)

*Primary Examiner* — Mang Tin Bik Lian
(74) *Attorney, Agent, or Firm* — David B. Kelley; Brooks Kushman P.C.

(57) ABSTRACT

Inductor cooling systems and methods are disclosed. A vehicle may include a transmission case including a coolant inlet and an inductor assembly having a flange extending around a periphery thereof. A thermally conductive cover having a sealing surface may form a seal with the flange. A cavity may be defined between the cover and the inductor assembly and configured to receive coolant from the coolant inlet. A thermal interface material (TIM) may be in contact with a surface of the cover and a surface of the transmission case. The TIM may be a solid or a paste-like substance. If the TIM is solid, it may be in a state of compression between a bottom surface of the cover and the surface of the transmission case. The TIM may transfer heat from coolant in the cavity to the transmission case while the coolant is not being circulated.

17 Claims, 10 Drawing Sheets

(51) Int. Cl.
    *B60K 6/365*     (2007.10)
    *B60K 6/44*      (2007.10)
    *B60K 6/547*     (2007.10)
    *F16H 3/091*     (2006.01)
    *F16H 3/72*      (2006.01)
    *F16H 37/04*     (2006.01)

(56) References Cited

U.S. PATENT DOCUMENTS

| | | | |
|---|---|---|---|
| 6,392,519 B1 * | 5/2002 | Ronning | H01F 27/025 |
| | | | 336/61 |
| 7,851,954 B2 | 12/2010 | Endo et al. | |
| 8,917,511 B2 | 12/2014 | Yamamoto et al. | |
| 8,947,147 B1 | 2/2015 | Zhang | |
| 8,947,187 B2 | 2/2015 | MacLennan | |
| 9,373,436 B2 | 6/2016 | Pal | |
| 2010/0253153 A1 | 10/2010 | Kondo et al. | |
| 2012/0044647 A1 | 2/2012 | Lee et al. | |
| 2012/0139684 A1 * | 6/2012 | Kobayashi | H01F 27/022 |
| | | | 336/92 |
| 2013/0265129 A1 * | 10/2013 | Ansari | H01F 27/22 |
| | | | 336/61 |
| 2014/0132378 A1 | 5/2014 | Vafakhah et al. | |
| 2014/0132382 A1 | 5/2014 | Zarei et al. | |
| 2014/0175867 A1 | 6/2014 | Sung et al. | |
| 2014/0266527 A1 * | 9/2014 | Vafakhah | H01F 3/14 |
| | | | 336/65 |
| 2015/0097644 A1 * | 4/2015 | Shepard | H01F 27/08 |
| | | | 336/60 |
| 2015/0116064 A1 | 4/2015 | Kumar et al. | |
| 2016/0005521 A1 | 1/2016 | Pal | |
| 2018/0130592 A1 * | 5/2018 | Yonak | F16H 57/0415 |

* cited by examiner

INDUCTOR COOLING SYSTEMS AND METHODS

TECHNICAL FIELD

The present disclosure is related to inductor cooling systems and methods, for example, for hybrid or electric vehicle inverter inductors.

BACKGROUND

The term "electric vehicle" as used herein, includes vehicles having an electric machine for vehicle propulsion, such as battery electric vehicles (BEV), hybrid electric vehicles (HEV), and plug-in hybrid electric vehicles (PHEV). A BEV includes an electric machine, wherein the energy source for the electric machine is a battery that is re-chargeable, for example, from an external electric grid. In a BEV, the battery is the source of energy for vehicle propulsion. A HEV includes an internal combustion engine and one or more electric machines, wherein the energy source for the engine is fuel and the energy source for the electric machine is a battery. In a HEV, the engine may be the main source of energy for vehicle propulsion with the battery providing supplemental energy for vehicle propulsion (e.g., the battery buffers fuel energy and recovers kinematic energy in electric form). A PHEV is like a HEV, but the PHEV may have a larger capacity battery that is rechargeable from the external electric grid. In a PHEV, the battery may be the main source of energy for vehicle propulsion until the battery depletes to a low energy level, at which time the PHEV may operate like a HEV for vehicle propulsion.

Electric vehicles may include a voltage converter (DC-DC converter) connected between the battery and the electric machine. Electric vehicles that have AC electric machines may also include an inverter connected between the DC-DC converter and each electric machine. A voltage converter may increase ("boosts") or decrease ("bucks") the voltage potential to facilitate torque capability optimization. The DC-DC converter may include an inductor (or reactor) assembly, switches and diodes. A typical inductor assembly may include a conductive coil that is wound around a magnetic core. The inductor assembly generates heat as current flows through the coil. At least a portion of the generated heat may need to be dissipated for the inductor to operate effectively.

SUMMARY

In at least one embodiment, a vehicle is provided. The vehicle may include a transmission case including a coolant inlet; an inductor assembly having a flange extending around a periphery thereof; a thermally conductive cover having a sealing surface forming a seal with the flange; a cavity defined between the cover and the inductor assembly and configured to receive coolant from the coolant inlet; and a thermal interface material in contact with a surface of the cover and a surface of the transmission case.

In one embodiment, the thermal interface material is a solid layer having a thermal conductivity of at least 10 $W \cdot m^{-1} \cdot K^{-1}$. In this embodiment, the thermal interface material may be formed of a metal or a thermally conductive polymer. The thermal interface material may have a thickness of 0.5 to 10 mm. A first surface of the thermal interface material may contact a bottom surface of the cover over at least 75% of a surface area of the bottom surface. At least 95%, by area, of a second surface of the thermal interface material may be in contact with the surface of the transmission case. The solid layer may be in a state of compression between the surface of the cover and the surface of the transmission case.

In another embodiment, the thermal interface material is a layer of thermally conductive paste having a thermal conductivity of at least 10 $W \cdot m^{-1} \cdot K^{-1}$. The thermally conductive paste may contact a bottom surface of the cover over at least 95% of a surface area of the bottom surface. The thermally conductive paste may have a thickness of 0.05 to 1 mm. In one embodiment, the thermally conductive cover has a thermal conductivity of at least 10 $W \cdot m^{-1} \cdot K^{-1}$. The thermally conductive cover may be a metal cover. The thermal interface material may be configured to transfer heat from the thermally conductive cover to the surface of the transmission case.

In at least one embodiment, a vehicle is provided. The vehicle may include a transmission case including a coolant inlet; an inductor assembly; a thermally conductive cover sealed around a periphery of the inductor assembly; a cavity defined between the cover and the inductor assembly and configured to receive coolant from the coolant inlet; and a compressed solid thermal interface material in contact with a bottom surface of the cover and a surface of the transmission case.

The thermally conductive cover may be formed of metal and the compressed solid thermal interface material may be formed of an electrically insulating material. In one embodiment, a first surface of the compressed solid thermal interface material contacts the bottom surface of the cover over at least 75% of a surface area of the bottom surface. The thermal interface material may be formed of a thermally conductive polymer.

In at least one embodiment, a method is provided. The method may include: in a circulating mode, circulating coolant in a cavity defined between a flange around an inductor assembly and a thermally conductive cover sealed to the flange to cool a conductive coil of the inductor assembly; and in a pooling mode, cooling the conductive coil by transferring heat therefrom to a vehicle transmission case via pooled coolant in the cavity, the thermally conductive cover, and a thermal interface material.

The circulating coolant may directly contact the conductive coil in the circulating mode and the pooled coolant may directly contact the conductive coil in the pooling mode. In one embodiment, the circulating coolant and the pooled coolant directly contact only a bottom portion of the conductive coil, a top portion of the conductive coil being cooled by heat transfer to the bottom portion of the conductive coil.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
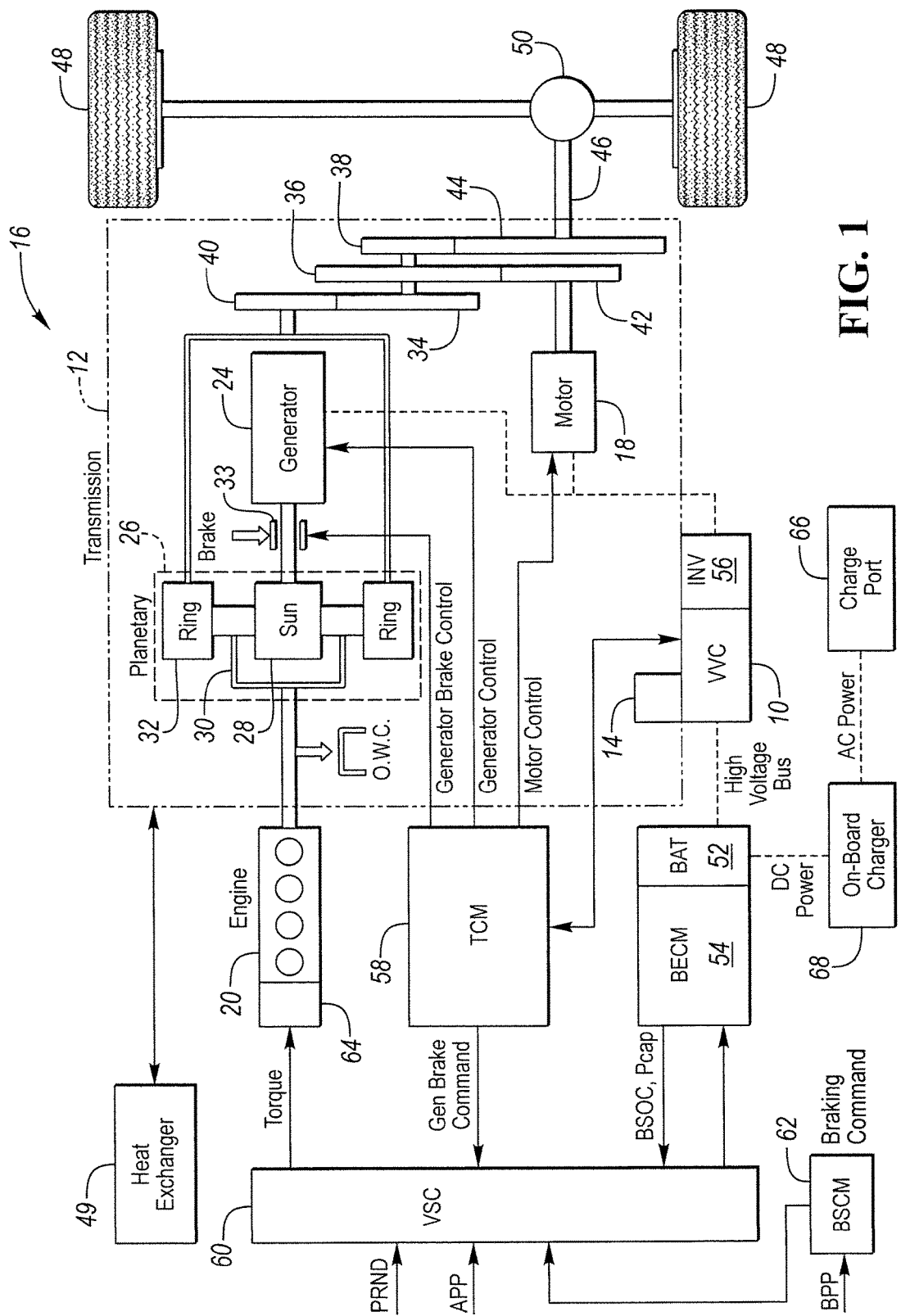
FIG. 1 is a schematic diagram of a plug-in hybrid electric vehicle (PHEV), according to an embodiment.

Referring to FIG. 1, a transmission 12 is depicted within a plug-in hybrid electric vehicle (PHEV) 16, which is an electric vehicle propelled by an electric machine 18 with assistance from an internal combustion engine 20 and connectable to an external power grid. The electric machine 18 may be an AC electric motor depicted as "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 may have a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48. The transmission also includes a heat exchanger or automatic transmission fluid cooler 49 for cooling the transmission fluid.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability to other vehicle systems and controllers.

The transmission 12 includes a DC-DC converter or variable voltage converter (VVC) 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 may provide a regenerative braking command to the VSC 60.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 16 may be configured as a plug-in hybrid electric vehicle (PHEV). The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Although illustrated and described in the context of a PHEV 16, it is understood that the VVC 10 may be implemented on other types of electric vehicles, such as a HEV or a BEV.

The transmission 12 may include a transmission housing. As described above, the engine 20, the motor 18 and the generator 24 may include output gears that mesh with corresponding gears of the planetary gear unit 26. These mechanical connections may occur within an internal chamber of the transmission housing. A power electronics housing may be mounted to an external surface of the transmission 12. The inverter 56 and the TCM 58 may be mounted within a power electronics housing.

The VVC 10 is an assembly with components that may be mounted both inside and/or outside of a transmission 12. The VVC 10 includes an inductor assembly 14. In one embodiment, the inductor assembly 14 may be located within the transmission housing. In other embodiments the inductor assembly 14 may be located outside or partially outside of the transmission. The VVC 10 may also include a number of switches and diodes that are mounted in the power electronics housing, which is outside of the transmission 12, and are operably coupled to the inductor assembly 14.

Figure 2:
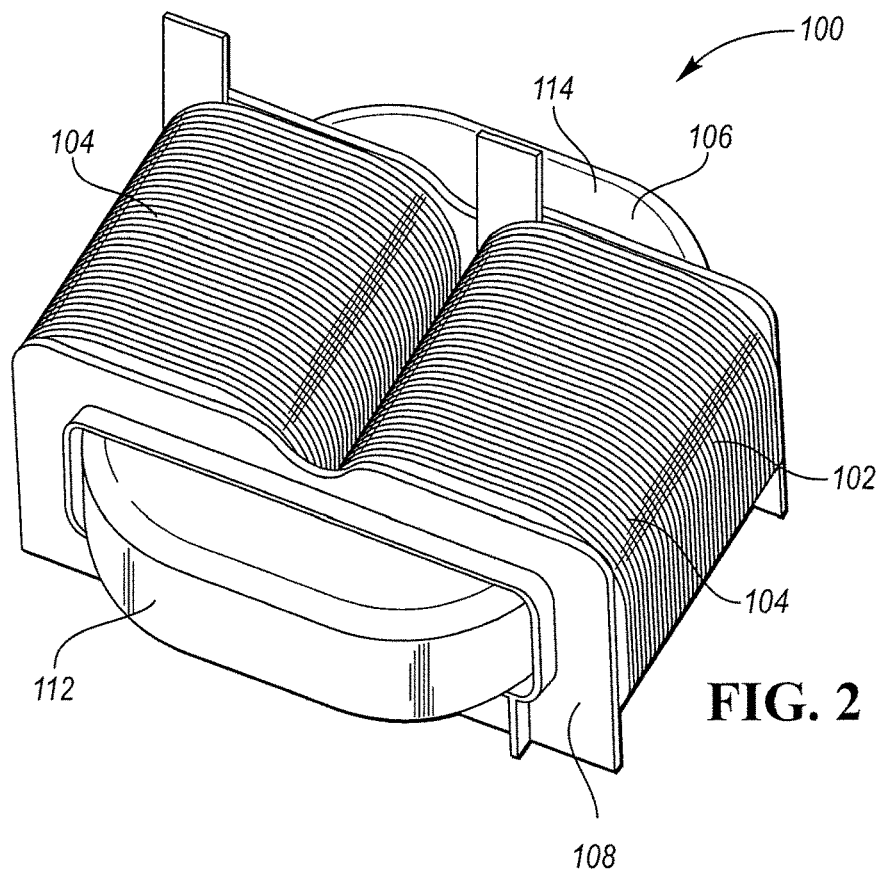
FIG. 2 is a perspective view of an inductor assembly, according to an embodiment.
Figure 3:
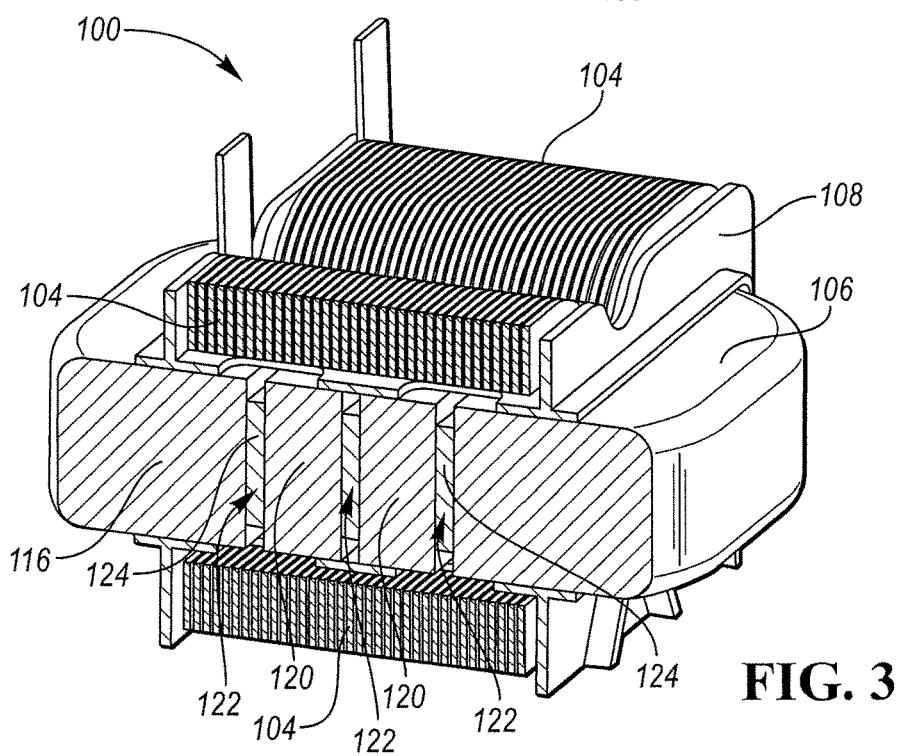
FIG. 3 is a cross-sectional view of the inductor assembly of FIG. 2.

With reference to FIGS. 2-3, an inductor assembly 100 is shown, which may be an embodiment of the inductor assembly 14 shown in FIG. 1. The inductor assembly 100 may be placed in various locations on the vehicle, such as within the transmission housing, the power electronics housing, or any other suitable location. The inductor assembly 100 includes a conductor 102, which may be formed into coils 104. In one embodiment, the conductor 102 is formed into two adjacent tubular coils 104, as shown. The inductor assembly 100 may also include a core 106 and an insulator 108. The conductor 102, such as the coils 104, may be wrapped around the core 106, as shown. The inductor assembly 100 may include the insulator 108, which may be formed as a two-piece bracket and may support the conductor 102 and the core 106. Additionally, the insulator 108 may physically separate the conductor 102 from the core 106 and may be formed of an electrically insulating polymeric material, such as polyphenylene sulfide (PPS).

The conductor 102 may be formed of an electrically conductive material, such as copper or aluminum, and may be wound into two adjacent helical coils 104. The coils 104 may be formed using a rectangular (or flat) type conductive wire by an edgewise process. Input and output leads 110 may extend from the conductor 102 and connect to other components.

In one embodiment, the core 106 may be formed in a dual "C" configuration, in which the core 106 includes a first end 112 and a second end 114 that are each formed in a curved shape. The core 106 may also include a first leg 116 and a second leg 118 (not show, opposite leg 116) for interconnecting the first end 112 to the second end 114 to collectively form a ring-shaped core 106. Each leg 116, 118 may include a plurality of core elements 120 that are spaced apart to define air gaps 122. The core 106 may be formed of a magnetic material, such as an iron-based material or alloy. In one embodiment, the core 106 may be formed of an iron-silicon alloy powder. Ceramic spacers 124 may be placed between the core elements 120 to maintain the air gaps 122. An adhesive may be applied to the core 106 to maintain the position of the ends 112, 114 and the legs 116, 118 including the core elements 120 and the spacers 124. Alternatively, a strap (not shown) may be secured about an outer circumference of the core 106 to maintain the position of the ends 112, 114 and the legs 116, 118.

Figure 4:
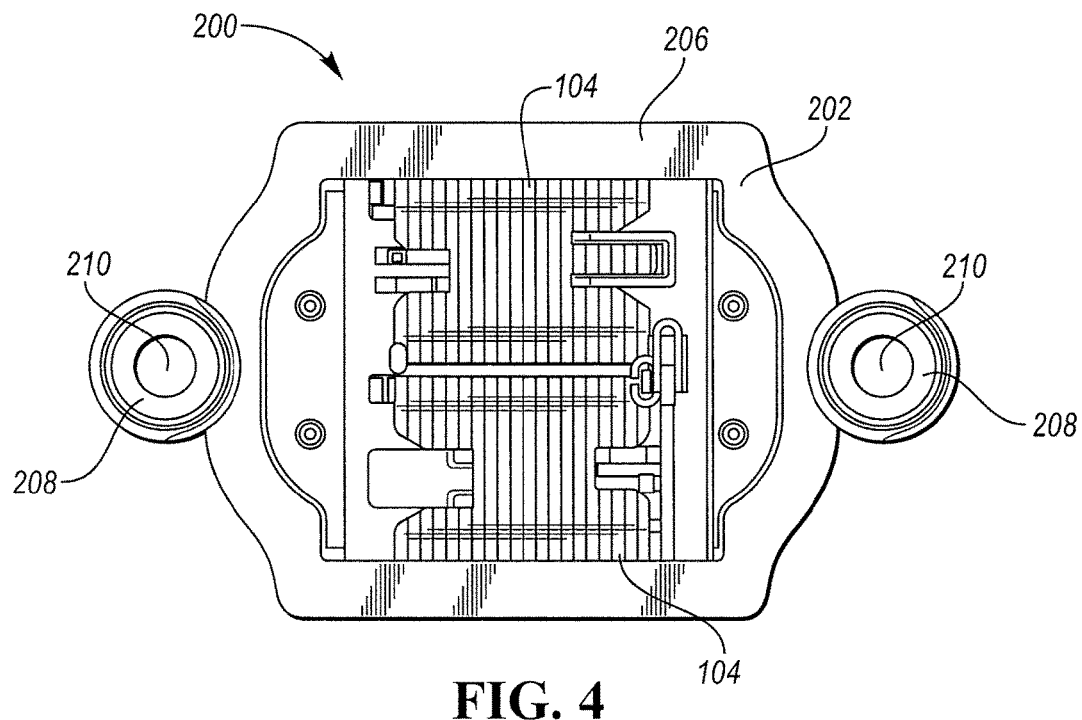
FIG. 4 is a top view of a top portion of an inductor cooling system, according to an embodiment.
Figure 5:
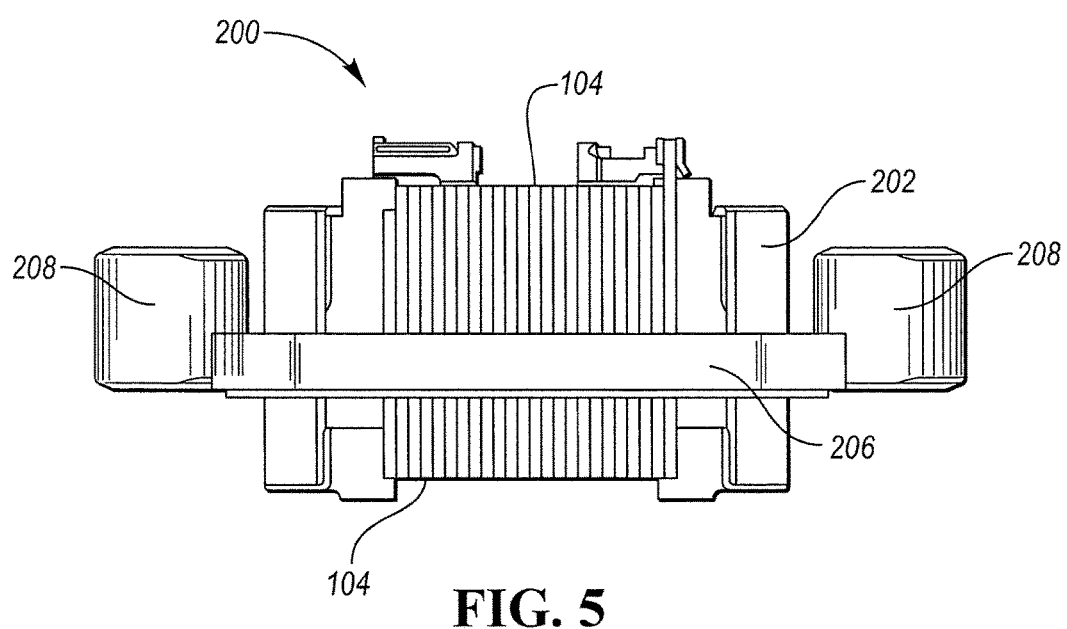
FIG. 5 is a side view of the top portion of of FIG. 4.
Figure 6:
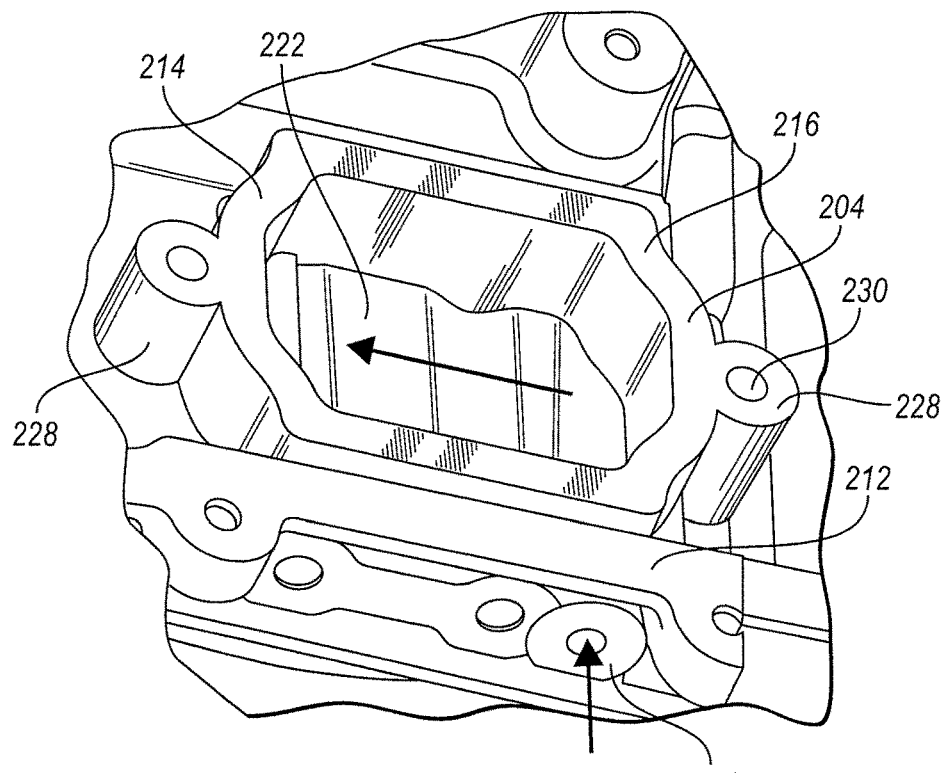
FIG. 6 is a perspective view of a base portion of an inductor cooling system, according to an embodiment.
Figure 7:
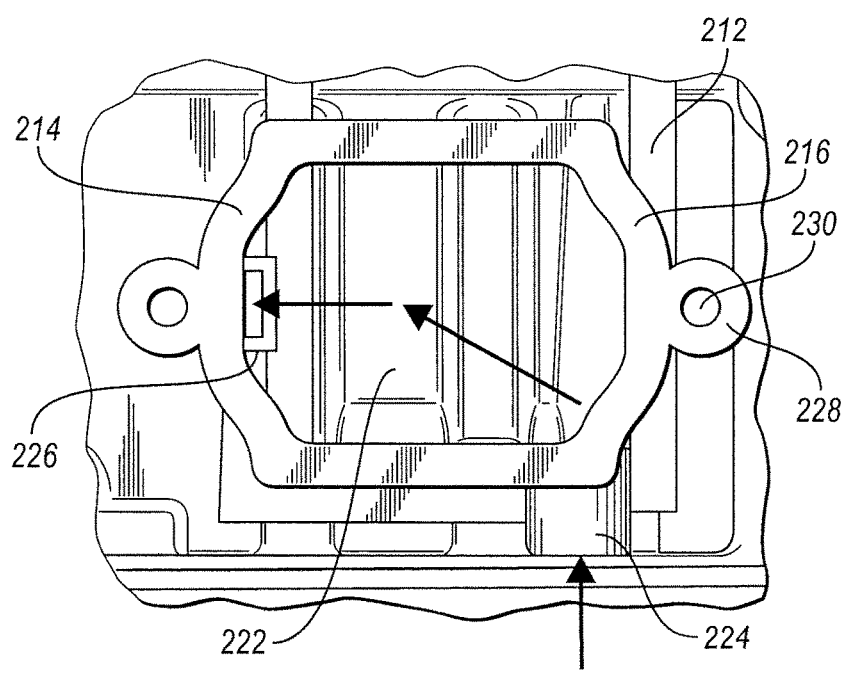
FIG. 7 is a top view of the base portion of FIG. 6.
Figure 8:
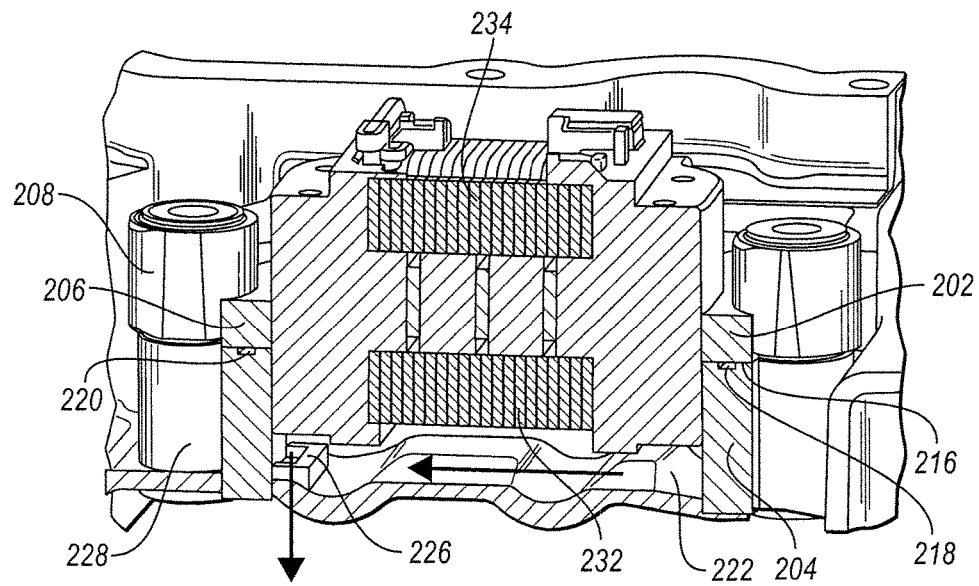
FIG. 8 is a cross-sectional view of an inductor cooling system with top and base portions assembled, according to an embodiment.

With reference to FIGS. 4-8, an embodiment of an inductor cooling system 200 is shown. FIGS. 4 and 5 show a top view and a side view, respectively, of a top portion 202 of the system 200 that includes the inductor assembly 100. FIGS. 6 and 7 show a perspective and top view, respectively of a base or bottom portion 204 of the system 200. FIG. 8 shows a cross section of the system 200.

With reference to FIGS. 4 and 5, the inductor assembly 100 is shown incorporated into a top portion 202 of the cooling system 200. The top portion 202 may be coupled to a bottom or base portion 204, as described in additional detail below. While the system 200 is described as having a top and bottom portion, components described as part of one or the other are not limited to that configuration. In addition, there may be greater or fewer portions (e.g., 1, 3, 4, etc.). The inductor assembly 100 may be at least partially surrounded on an outer edge or periphery by a flange 206. In one embodiment, the flange 206 may surround the entire inductor assembly 100. The flange 206 may be parallel with the inductor core 106. The flange 206 may be overmolded onto the inductor assembly 100, for example, by injection molding. In other embodiments, the flange 206 may be attached to the inductor assembly by other means, such as by an adhesive or mechanical fasteners (e.g., screws, rivets, etc.). Another alternative is that the flange 206 is formed of two (or more) pieces that cooperate to form an enclosure around the flange 206 (e.g., two halves that cooperate).

The top portion 202 may include one or more fastener portions 208, which may also be referred to as retention bosses. The fastener portions 208 may include an aperture or bore 210 that is configured to receive a fastener, such as a bolt or a screw. The bore 210 may be threaded or flush, depending on the type of fastener being used. The fastener portion(s) 208 may be formed integrally (e.g., as a single piece) with the flange 206, or they may be formed separately and attached using any suitable method (e.g., adhesives or mechanical fasteners). In the embodiment shown, there are two fastener portions 208, one on each end of the top portion 202 or inductor assembly 100 (e.g., on the long axis). However, the fastener portion(s) 208 may be located at any suitable location and there may be a greater or lower number than two. For example, two fastener portions 208 may be located one on each side on the short axis, or a fastener portion 208 may be located one on each side. In one embodiment, the fastener portion(s) 208 may extend upward from the flange 206 but not below the flange 206. In another embodiment, the fastener portion(s) 208 may have a generally hollow cylindrical shape, with the bore 210 at the center. The fastener portion(s) 208 may be configured to allow the top portion 202 to be attached or secured to the bottom or base portion 204 of the cooling system 200.

With reference to FIGS. 6 and 7, embodiments of a bottom or base portion 204 of the cooling system 200 are shown. In one embodiment, the base portion 204 may be formed on a transmission case 212. The base portion 204 may include an inductor sealing wall 214 that extends from a wall, surface, or portion of the transmission case 212. The inductor sealing wall 214 may have a top sealing surface 216 that is configured to seal with the flange 206 of the top portion 202. As shown in FIG. 8, the sealing surface 216 may have a channel, groove, or recess 218 formed therein, which may receive a gasket or seal 220. The gasket 220 may be a deformable or conformable material that may form a liquid-tight seal between the flange 206 and the sealing surface 216 when the top and bottom portions of the cooling system 200 are connected and assembled.

The inductor sealing wall 214 may have an outer periphery that defines an inner cavity or cooling chamber 222. The sealing wall 214 may be integrally formed with the transmission case 212, such that they are a single piece and formed of a single material. For example, if the transmission case 212 is formed by casting, the sealing wall 214 may be integrally formed with the transmission case 212 as part of the casting process. Alternatively, the sealing wall 214 may be formed separately from the transmission case 212 and attached to a wall, surface, or portion of the transmission case 212 at a later time. For example, the sealing wall 214 may be attached to the transmission case by welding, brazing, adhesives, mechanical fastening, or other suitable attachment methods. Whether integrally formed or later attached, the sealing wall 214 and the transmission case 212 may form the cavity 222, with the transmission case 212 forming the bottom wall of the cavity 222 and the sealing wall 214 providing the side wall. When the top and bottom portions 202, 204 of the cooling system are combined and assembled, the inductor assembly 100 and flange 206 may form the top wall of the cavity 222, which may be liquid sealed except for an inlet 224 and an outlet 226 for a coolant.

The inlet 224 and outlet 226 may allow for a coolant, such as automatic transmission fluid (ATF), to enter and exit the cavity 222, respectively. The inlet 224 and/or outlet 226 may be integrally formed with the inductor sealing wall 214 or may be attached to it using any suitable method (such as those described above). . In embodiments where the inlet 224 and/or outlet 226 is cast as part of the transmission case, the channels therein may also be cast-in or they may be machined into the inlet 224 and/or outlet 226 after casting. The same may apply for any other cast-in components disclosed herein having a bore, channel, passage, etc. formed therein. The inlet 224 and outlet 226 may contact the transmission case 212 and allow the coolant to flow through a wall thereof In the embodiments shown in FIGS. 6-8, the inlet 224 is formed integrally with a side of the sealing wall 214. As shown, the inlet 224 may be generally cylindrical in shape, having a central bore or lumen therein to transport the coolant. However, the inlet 224 may have any suitable shape that allows coolant to flow into the cavity 222 from an exterior source. The inlet 224 may extend from the sealing wall 214 (e.g., the outer periphery) to a wall or surface of the transmission case 212. The inlet 224 may be perpendicular or substantially perpendicular to the wall or surface of the transmission case 212. The bore/lumen/passage in the inlet 224 may extend through the wall/surface of the transmission case 212 (or abut an opening in the wall) and may be configured to receive coolant from a tube, hose, or other conduit. For example, a conduit may carry coolant from a tank or reservoir, which may be pumped to the inlet 224 under pressure using a pump (e.g., a displacement pump).

The outlet 226 may be formed as part of the sealing wall 214 and may extend to a wall or surface of the transmission case, for example, a wall/surface that is generally parallel to the flange 206 and/or perpendicular to the wall/surface to which the inlet 224 contacts or opposite the inductor assembly 100. The outlet 226 may include a bore/passage/channel therein that extends through the wall or abuts an opening in the wall. The outlet 226 may be configured to transfer coolant from the cavity 222 to a tube, hose, or other conduit. For example, a conduit may carry the coolant from the outlet 226 to a tank or reservoir, which may be the same tank/reservoir connected to the inlet 224 or a different one. A pump may be included in the system to pump the coolant to the tank/reservoir under pressure. Accordingly, coolant may be pumped into the cavity 222 through the inlet 224, may traverse the cavity 222, and then may exit the cavity 222 through the outlet 226. The coolant may form a closed loop (e.g., returning to the same tank after being pumped out) or it may be pumped to a different location (open loop). One or more heat exchangers (e.g., radiators) may be disposed in the coolant loop to remove heat from the coolant, thereby allowing it to be recirculated to the cavity 222.

In one embodiment, the inlet 224 and the outlet 226 may be spaced apart or disposed on opposite ends of the sealing wall 214 or cavity 222. For example, in the embodiment shown in FIGS. 6-8, the inlet 224 is shown on the right side of the sealing wall 214 and the outlet 226 is shown on the left side. This may force the coolant to flow across the cavity 222 and across the coils 104 of the inductor assembly 100 (described in greater detail, below). The inlet 224 and outlet 226 may be at or near each end of the long axis of the sealing wall 214.

The base portion 204 of the cooling system 200 may include one or more fastener portions 228, which may be similar to the fastener portions 208 of the top portion 202 of the cooling system 200 (and may also be referred to as retention bosses). The fastener portions 228 may include an aperture or bore 230 that is configured to receive a fastener, such as a bolt or a screw. The bore 230 may be threaded or flush, depending on the type of fastener being used. The fastener portion(s) 228 may be formed integrally (e.g., as a single piece) with the sealing wall 214 or they may be formed separately and attached using any suitable method (e.g., adhesives or mechanical fasteners). Alternatively, the fastener portions 228 may be separate from the sealing wall 214. In the embodiment shown, there are two fastener portions 228, one on each end of the base portion 204 (e.g., on the long axis). However, the fastener portion(s) 228 may be located at any suitable location and there may be a greater or lower number than two. For example, two fastener portions 228 may be located one on each side on the short axis, or a fastener portion 228 may be located one on each side. In one embodiment, the fastener portion(s) 228 may extend upward from a wall of the transmission case 212. In another embodiment, the fastener portion(s) 228 may have a generally hollow cylindrical shape, with the bore 230 at the center.

The fastener portion(s) 228 of the base portion 204 may be configured to align with the fastener portion(s) 208 of the top portion 202 of the cooling system 200. The fastener portion(s) 228 of the base portion 204 may act as pylons or pillars to support and receive the fastener portion(s) 208 of the top portion 202. There may be an equivalent number of cooperating fastener portions in the top and base portions. The fastener portions may be configured such that a single fastener engages with or cooperates with a fastener portion 208 and a fastener portion 228 to secure the top portion 202 to the base portion 204. Accordingly, if there are two fastener portions in each of the top portion 202 and base portion 204, then two fasteners may secure the top and base portions together.

With reference to FIG. 8, a cross-sectional view is shown of the cooling system 200 with the top portion 202 secured onto the base portion 204. As shown, the sealing surface 216 of the sealing wall 214 may have a channel, groove, or recess 218, which may have a gasket or seal 220 disposed therein. Alternatively, the channel/groove/recess may be formed in the bottom of the flange 206, or both the flange 206 and the sealing surface 216 may have a channel/groove/recess to receive the gasket 220. The gasket 220 may form a liquid-tight seal between the flange 206 and the sealing surface 216 when the top and bottom portions of the cooling system 200 are connected and assembled.

With the top portion 202 secured to the base portion 204, the cavity 222 may be closed/sealed except for the inlet 224 and outlet 226. A bottom portion 232 (e.g., only the bottom portion) of the conductor 102, shown as a pair of coils 104, of the inductor assembly 100 may be disposed within the cavity 222 when the system 200 is assembled. A top portion 234 of the conductor 102 may be disposed outside of the cavity 222. The flange 206 may be the divider of the top and bottom portions. As described above, a coolant, such as ATF, other oils, a water-glycol mixtures, etc., may be pumped into the cavity 222 through an inlet 224 and may exit the cavity 222 through an outlet 226. Accordingly, coolant may be circulated within/through the cavity 222. With the bottom portion 232 of the conductor 102 (e.g., coils 104) disposed within the cavity 222, the coolant may be configured to directly contact the bottom of the coils, thereby absorbing heat from the coils and removing it as the coolant exits the cavity 222. The coolant may then dispose of the absorbed heat at a heat exchanger after exiting through the outlet 226. The coolant may be continuously pumped/circulated through the cavity and over the coils 104 to remove heat from the coils. In one embodiment, the coolant may be continuously pumped/circulated while the inductor assembly 100 is in operation (e.g., circulating mode). When the inductor assembly 100 is not in operation, the coolant may not be pumped. During this time, the coolant may pool in the cavity 222 (e.g., pooling mode). The pooled coolant may transfer heat from the coils 104 to the transmission case 212, thereby providing passive cooling. However, in some embodiments, the coolant may be continuously pumped regardless of whether the inductor assembly 100 is operating.

While the bottom portion 232 of the conductor/coils may be directly in contact with the coolant, the top portion 234 may be sealed off from the coolant. In one embodiment, the top portion 234 of the conductor may be sealed off from the environment in general, for example, by overmolding. This may protect the top portion 234 from contamination or from potential damage. However, because the conductor/coils 104 are made of a thermally conductive material, heat generated in the top portion 234 may still be removed by the coolant in the cavity 222. As the heat is removed from the bottom portion 232 of the conductor, the temperature gradient in the conductor will cause heat from the top portion 234 to be drawn/conducted into the bottom portion 232. This heat may then similarly be removed by the coolant as it traverses the cavity 222.

Accordingly, the cooling system 200 shown in FIGS. 6-8 may include an inductor assembly that is attached to one or more walls/surfaces of a transmission case. A cavity is formed between the transmission case and the inductor assembly, for example, by a sealing wall formed integrally with the transmission case and a flange overmolded on the inductor assembly. The bottom portion of the inductor assembly may extend into the cavity when the inductor assembly is installed. A coolant, such as ATF, may be pumped/circulated into the cavity through an inlet in the transmission case wall and may directly contact coils of the inductor assembly to remove heat therefrom. The coolant may traverse the cavity and exit through an outlet in the transmission case wall, after which it may be cooled (e.g., by a heat exchanger) so that it can be used again. The closed cavity formed between the inductor assembly and the transmission case may allow for continuous, direct cooling of the inductor coils while the inductor is operating. The cooling system may allow for the elimination of potting compound that conventional systems may use to encapsulate or surround the coils and core of the inductor. Instead, the inductor coils (or at least a portion thereof) may be directly cooled by the coolant.

Figure 9:
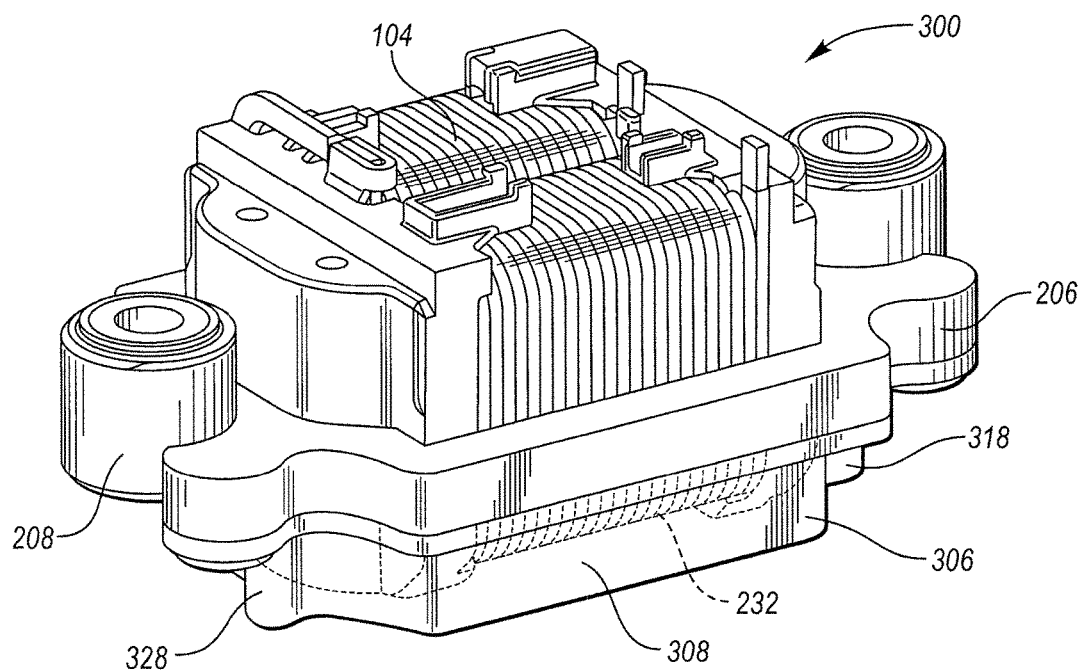
FIG. 9 is a perspective view of a top portion of an inductor cooling system, according to an embodiment.
Figure 10A:
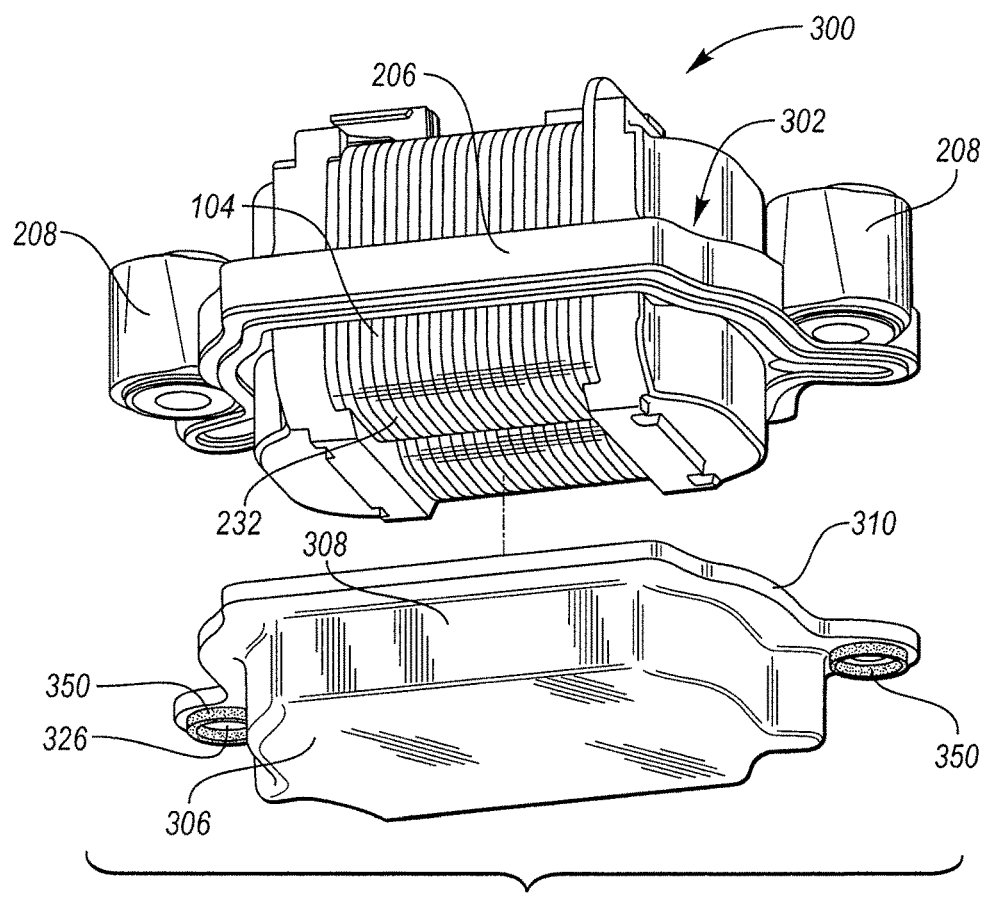
FIG. 10A is a partially exploded view of the top portion of FIG. 9.
Figure 10B:
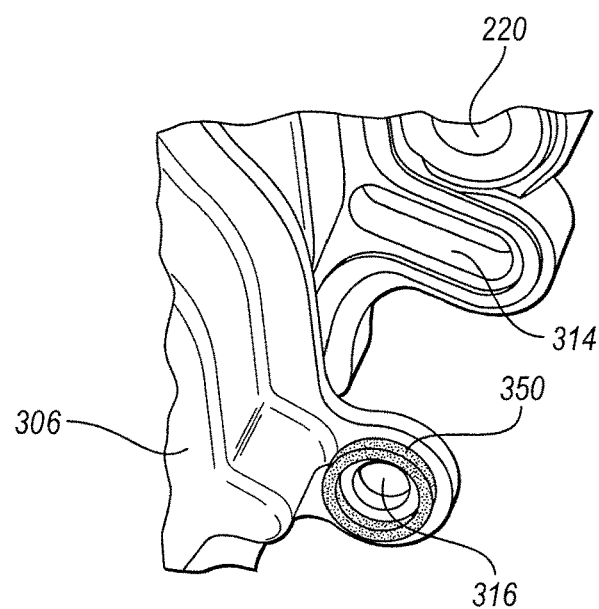
FIG. 10B is an enlarged view of a portion of FIG. 10A.
Figure 11:
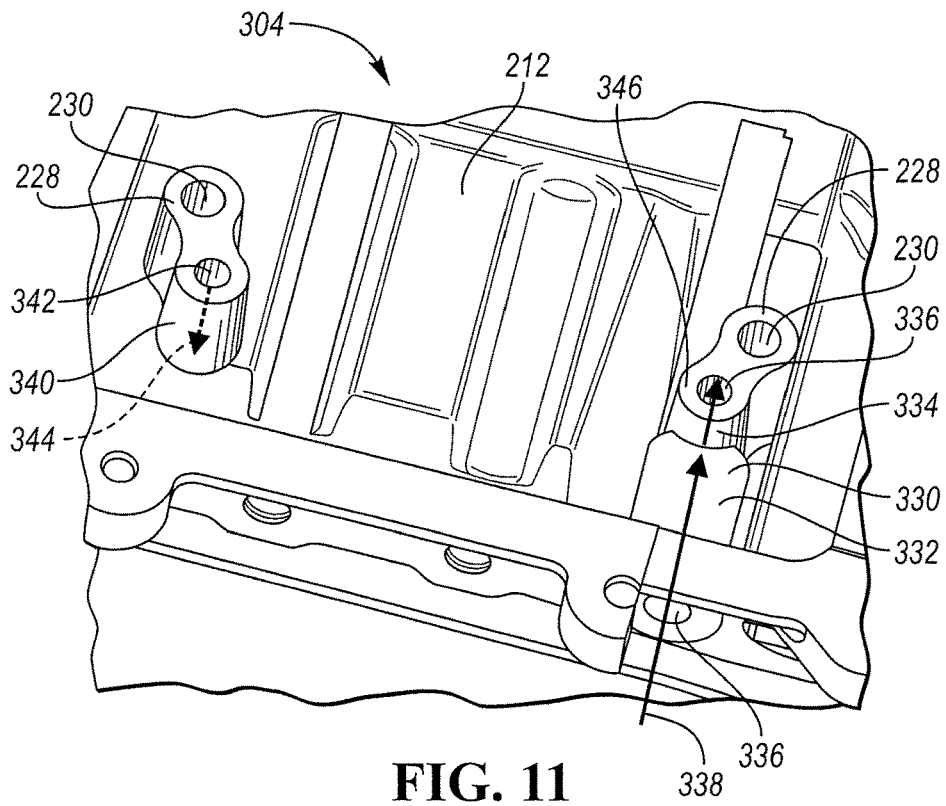
FIG. 11 is a perspective view of a base portion of an inductor cooling system, according to an embodiment.
Figure 12:
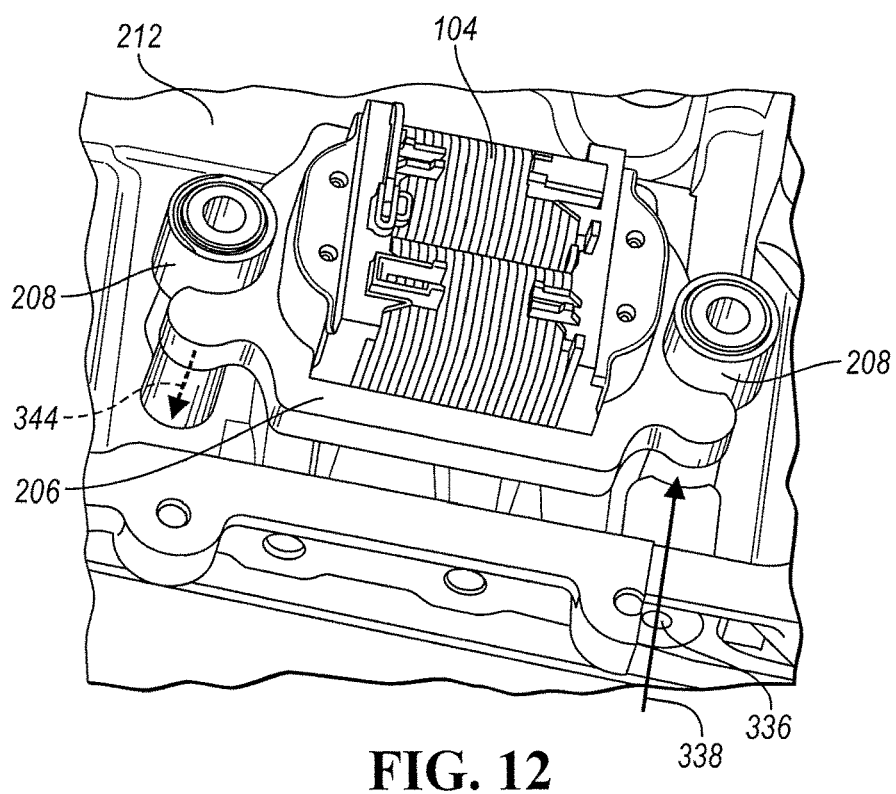
FIG. 12 is a perspective view of an inductor cooling system with top and base portions assembled, according to an embodiment.
Figure 13:
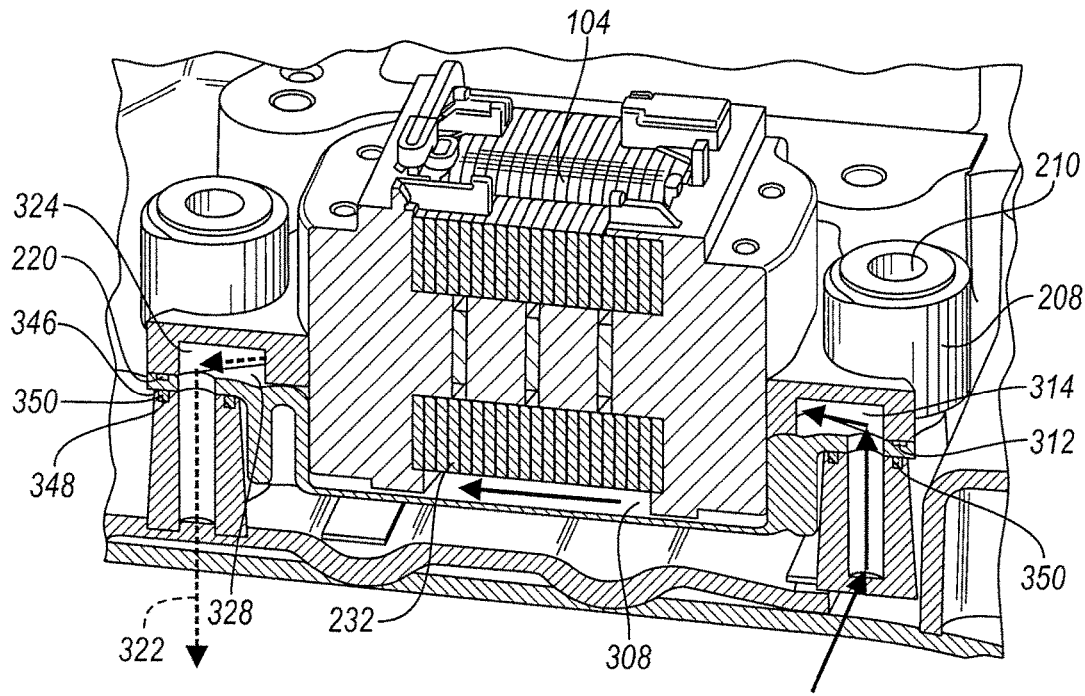
FIG. 13 is a cross-sectional view of the inductor cooling system of FIG. 12.
Figure 14:
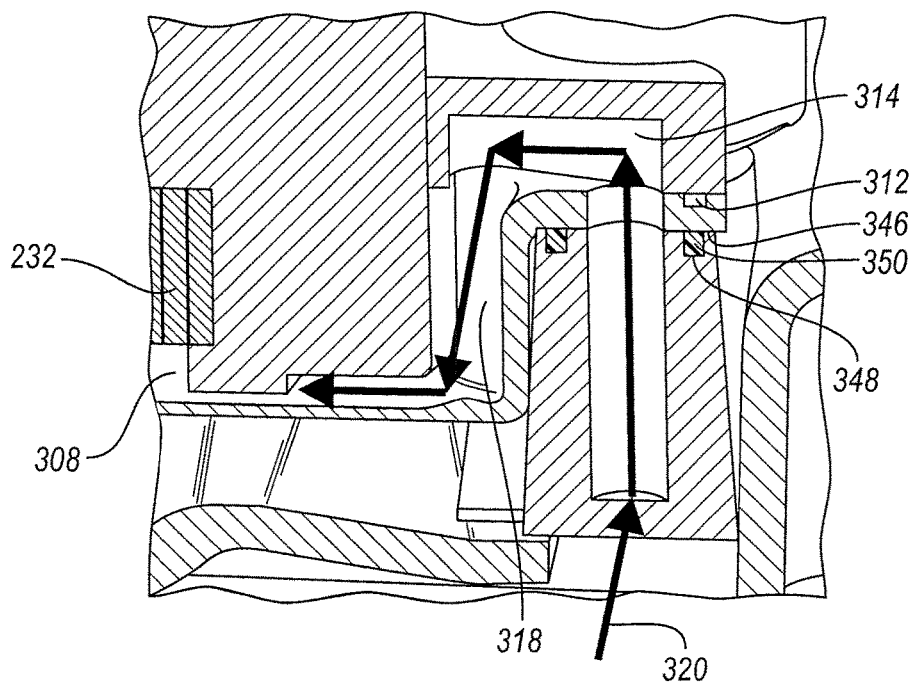
FIG. 14 is a cross-sectional view of a coolant inlet flow path of the inductor cooling system of FIG. 12, according to an embodiment.

With reference to FIGS. 9-14, an embodiment of an inductor cooling system 300 is shown. FIGS. 9 and 10 show a perspective view and a partially exploded view, respectively, of a top portion 302 of the system 300 that includes the inductor assembly 100. FIG. 11 shows a perspective view of a base or bottom portion 304 of the system 300. FIGS. 12-14 show several views of the top and base portions of the system 300 once they have been secured and installed. Elements common to systems 200 and 300 have been numbered the same and may not be described again in detail.

With reference to FIGS. 9, 10A, and 10B, the top portion 302 of the cooling system 300 are shown. Similar to system 200, the system 300 may include an inductor assembly 100, which may be at least partially surrounding by a flange 206. The top portion 302 may also include one or more one or more fastener portions 208, which may also be referred to as retention bosses. The fastener portions 208 may include an aperture or bore 210 that is configured to receive a fastener, such as a bolt or a screw. The bore 210 may be threaded or flush, depending on the type of fastener being used. The fastener portion(s) 208 may be formed integrally (e.g., as a single piece) with the flange 206, or they may be formed separately and attached using any suitable method (e.g., adhesives or mechanical fasteners). In the embodiment shown, there are two fastener portions 208, one on each end of the top portion 302 or inductor assembly 100 (e.g., on the long axis). However, the fastener portion(s) 208 may be located at any suitable location and there may be a greater or lower number than two. For example, two fastener portions 208 may be located one on each side on the short axis, or a fastener portion 208 may be located one on each side. In one embodiment, the fastener portion(s) 208 may extend upward from the flange 206 but not below the flange 206. In another embodiment, the fastener portion(s) 208 may have a generally hollow cylindrical shape, with the bore 210 at the center. The fastener portion(s) 208 may be configured to allow the top portion 302 to be attached or secured to the bottom or base portion 304 of the cooling system 300.

The cooling system 300 may include an inductor cover or case 306 that forms a cavity 308 around the bottom portion 232 of the conductor. This is in contrast to cooling system 200, wherein the cavity 222 around the bottom portion 232 of the conductor is formed between the inductor assembly 100 and the transmission case 212. The cover 306 may be formed of any suitable material, for example, a thermally conductive material (e.g., a metal, such as Al or Cu). However, the cover 306 may also be formed a non-thermally conductive material, such as a polymer. The cover 306 may have a sealing surface 310 (similar to the sealing surface 216) that is configured to contact and seal to the flange 206. One or both of the flange 206 and the sealing surface 310 may have a channel, groove, or recess 312 formed therein, which may receive a gasket or seal 220. The gasket 220 may be a deformable or conformable material that may form a liquid-tight seal between the flange 206 and the sealing surface 310 when the cover 306 is attached to the rest of the top portion 302. The gasket 220 may be attached (e.g., by adhesive) to one of the cover 306 and the flange 206 prior to securing the cover 306 to the flange 206. In the example shown in FIGS. 10, 13, and 14, the gasket 220 is attached to the flange 206 and the sealing surface 310 includes the recess 312. When the two components are secured together, a liquid-tight is formed.

The flange 206 in system 300 may differ from the flange in the system 200 in that it may include a recess 314 formed therein to allow coolant to flow into the cavity 308. The recess 314 may be configured to correspond to, overlap with, or otherwise be in communication with an opening or aperture 316 in the cover 306. The opening 316 may be disposed or defined in the sealing surface 310 of the cover 306. The cover 306 may include a passage 318 that is in communication with the recess 314 and the cavity 308. Together, the recess 314, the opening 316, and the passage 318 may form an inlet flow path 320 that may allow coolant to enter the cavity 308 from the base portion 304 of the system 300. The coolant may be initially received through the opening 316 (e.g., from the base portion 304) and then it may enter the recess 314 in the flange 206. From the recess, the coolant may travel through the passage 318 and into the cavity 308. An example of the flow path 320 and the components forming it is shown in FIGS. 10A, 10B, 13, and 14.

The flange 206 and the cover 306 may include similar structure to form an exit flow path 322 through which the coolant exits the cavity 308. For example, the flange 206 may include a recess 324 formed therein to allow coolant to flow out of the cavity 308. The recess 324 may be configured to correspond to, overlap with, or otherwise be in communication with an opening or aperture 326 in the cover 306. The opening 326 may be disposed or defined in the sealing surface 310 of the cover 306. The cover 306 may include a passage 328 that is in communication with the recess 324 and the cavity 308. After entering the cavity 308 from the passage 318, the coolant may travel through the cavity, cooling the coils 104. The coolant may then enter the passage 328 and flow into the recess 324. From the recess 324, the coolant may flow through the opening 326 and out of the top portion 302 of the system 300.

The base portion 304 of the system 300 may include one or more fastener portions 228, which may be similar to the fastener portions 208 of the top portion 202 of the cooling system 200 (and may also be referred to as retention bosses, pylons, or pillars). The fastener portions 228 may include an aperture or bore 230 that is configured to receive a fastener, such as a bolt or a screw. The bore 230 may be threaded or flush, depending on the type of fastener being used. The fastener portion(s) 228 may be formed integrally (e.g., as a single piece) with the transmission case 212 or they may be formed separately and attached using any suitable method (e.g., adhesives or mechanical fasteners). In the embodiment shown, there are two fastener portions 228, one on each end of the base portion 304 (e.g., on the long axis). However, the fastener portion(s) 228 may be located at any suitable location and there may be a greater or lower number than two. For example, two fastener portions 228 may be located one on each side on the short axis, or a fastener portion 228 may be located one on each side. In one embodiment, the fastener portion(s) 228 may extend upward from a wall of the transmission case 212. In another embodiment, the fastener portion(s) 228 may have a generally hollow cylindrical shape, with the bore 230 at the center.

The fastener portion(s) 228 of the base portion 304 may be configured to align with the fastener portion(s) 208 of the top portion 302 of the cooling system 300. There may be an equivalent number of cooperating fastener portions in the top and base portions. The fastener portions may be configured such that a single fastener engages with or cooperates with a fastener portion 208 and a fastener portion 228 to secure the top portion 302 to the base portion 304. Accordingly, if there are two fastener portions in each of the top portion 302 and base portion 304, then two fasteners may secure the top and base portions together.

The base portion 304 may also include a coolant inlet 330, which may be configured to receive coolant from outside the transmission case 212 and provide it to the cavity 308. Similar to the fastener portions 228, the coolant inlet 330 may be integrally formed with the transmission case or it may be formed separately and attached using any suitable method (e.g., adhesives or mechanical fasteners). The coolant inlet 330 may also be formed integrally with a fastener portion 228, as shown. In one embodiment, the coolant inlet 330 may be cast as part of the transmission case. As shown in FIGS. 11-14, the coolant inlet 330 may include a first portion 332 extending from a wall/surface of the transmission case 212 and a second portion 334 that may be generally perpendicular to the first portion 332 and may extend from a different wall/surface of the transmission case 212. Each portion may have a channel or bore 336 defined therein, and the channels 336 may be in liquid communication with each other to form a coolant inlet path 338. As described with respect to system 200, the coolant inlet 330 may receive coolant from a conduit, which may transfer coolant from a reservoir or tank to the system 300 via a pump. In embodiments where the coolant inlet 330 is cast as part of the transmission case, the bores 336 may also be cast-in or they may be machined into the coolant inlet 330 after casting. The same may apply for any other cast-in components disclosed herein having a bore, channel, passage, etc. formed therein.

The base portion 304 may further include a coolant outlet 340, which may be configured to receive coolant from cavity 308 (e.g., through passage 328) and allow it to be returned from the transmission case 212 to the tank or reservoir from which it came, or to a separate location. Similar to the inlet 330, the coolant outlet 340 may be integrally formed with the transmission case or it may be formed separately and attached using any suitable method (e.g., adhesives or mechanical fasteners). The coolant outlet 340 may also be formed integrally with a fastener portion 228, as shown. In one embodiment, the coolant outlet 340 may be cast as part of the transmission case. As shown in FIGS. 11-14, the coolant outlet 340 may extend from a wall of the transmission case 212. The coolant outlet 340 may have a channel or bore 342 defined therein, which may form a coolant outlet path 344.

The cover 306 may be in contact with and seal with the coolant inlet 330 and the coolant outlet 340. Similar to the seal between the flange 206 and the cover 306, the coolant inlet 330 may include a sealing surface 346, which may have a channel, groove, or recess 348 formed therein. A gasket or seal 350 may be disposed in the recess 348 to create a liquid-tight seal between the coolant inlet 330 and the cover 306. In one embodiment, the recess 348 and gasket 350 may surround the opening 316 in the cover 306, as shown in FIGS. 10A, 10B, 13, and 14. Alternatively, the channel/groove/recess may be formed in the bottom of the cover 306, or both the cover 306 and the sealing surface 346 may have a channel/groove/recess to receive the gasket 350. The gasket 350 may form a liquid-tight seal between the cover 306 and the sealing surface 346 when the top and bottom portions of the cooling system 300 are connected and assembled. The cover 306 may be in contact and seal with the coolant outlet 340 in a similar manner, therefore the same numerals are used.

When the cooling system 300 is in operation, coolant may enter the cavity 308 and may cool the conductor in a similar manner as described above with respect to cooling system 200. With the top portion 302 secured to the base portion 304, the cavity 308 may be closed/sealed except for the inlet 330 and outlet 340. A bottom portion 232 (e.g., only a bottom portion) of the conductor 102, shown as a pair of coils 104, of the inductor assembly 100 may be disposed within the cavity 308 when the system 300 is assembled. A top portion 234 of the conductor 102 may be disposed outside of the cavity 308. The flange 206 may be the divider of the top and bottom portions. As described above, a coolant, such as ATF, other oils, a water-glycol mixtures, etc., may be pumped/circulated into the cavity 308 via passage 318 and inlet 330 and may exit the cavity 308 through passage 328 and outlet 340. With the bottom portion 232 of the conductor 102 (e.g., coils 104) disposed within the cavity 308, the coolant may be configured to directly contact the bottom of the coils, thereby absorbing heat from the coils and removing it as the coolant exits the cavity 308. The coolant may then dispose of the absorbed heat at a heat exchanger after exiting through the outlet 340. The coolant may be continuously pumped/circulated through the cavity and over the coils 104 to remove heat from the coils. In one embodiment, the coolant may be continuously pumped while the inductor assembly 100 is in operation (e.g., circulating mode). When the inductor assembly 100 is not in operation, the coolant may not be pumped/circulated. When not being pumped/circulated, the coolant may pool in the cavity 308 (e.g., pooling mode). However, in some embodiments, the coolant may be continuously pumped regardless of whether the inductor assembly 100 is operating.

While the bottom portion 232 of the conductor/coils may be directly in contact with the coolant, the top portion 234 may be sealed off from the coolant. In one embodiment, the top portion 234 of the conductor may be sealed off from the environment in general, for example, by overmolding. This may protect the top portion 234 from contamination or from potential damage. However, because the conductor/coils 104 are made of a thermally conductive material, heat generated in the top portion 234 may still be removed by the coolant in the cavity 308. As the heat is removed from the bottom portion 232 of the conductor, the temperature gradient in the conductor will cause heat from the top portion 234 to be drawn/conducted into the bottom portion 232. This heat may then similarly be removed by the coolant as it traverses the cavity 308.

Accordingly, the cooling system 300 shown in FIGS. 9-14 may include an inductor assembly, including a cover surrounding a bottom portion of the inductor coils, that is attached to one or more walls/surfaces of a transmission case. A cavity is formed between the cover and the inductor assembly, for example, between the cover and a flange overmolded on the inductor assembly. The bottom portion of the inductor assembly may extend into the cavity when the inductor assembly is installed. A coolant, such as ATF, may be pumped into the cavity through an inlet in the transmission case wall and then a flow passage in the flange and the cover and may directly contact coils of the inductor assembly to remove heat therefrom. The coolant may traverse the cavity and exit through another flow passage in the flange and the cover and then through an outlet in the transmission case wall, after which it may be cooled (e.g., by a heat exchanger) so that it can be used again. The closed cavity formed between the inductor assembly and the cover may allow for continuous, direct cooling of the inductor coils while the inductor is operating. The cooling system may allow for the elimination of potting compound that conventional systems may use to encapsulate or surround the coils of the inductor. Instead, the inductor coils (or at least a portion thereof) may be directly cooled by the coolant.

Figure 15:
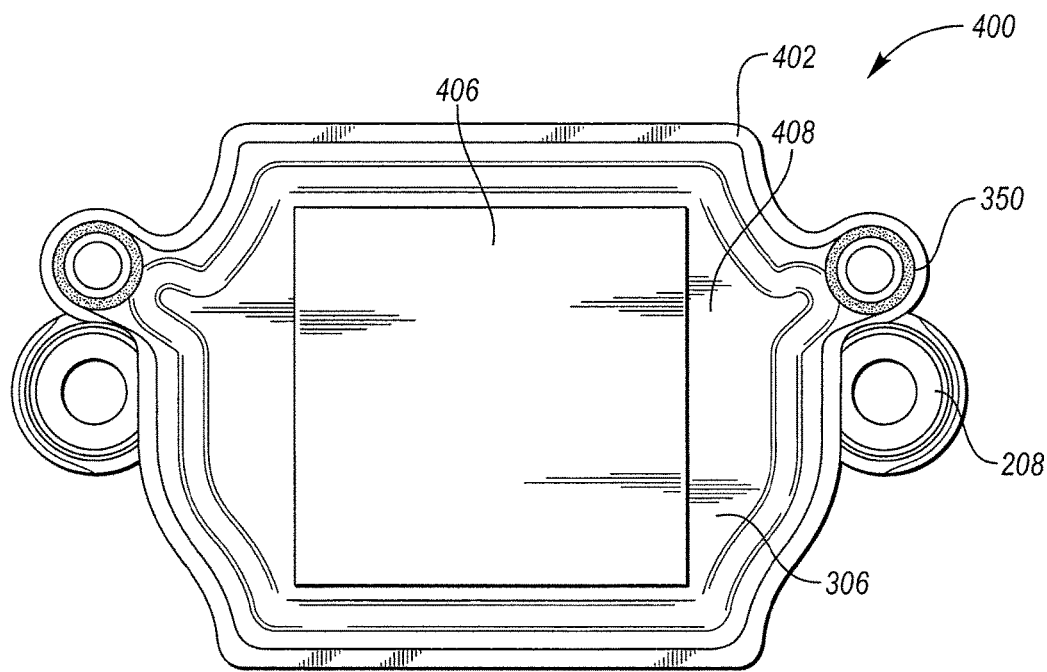
FIG. 15 is a bottom view of a top portion of an inductor cooling system, according to an embodiment.
Figure 16:
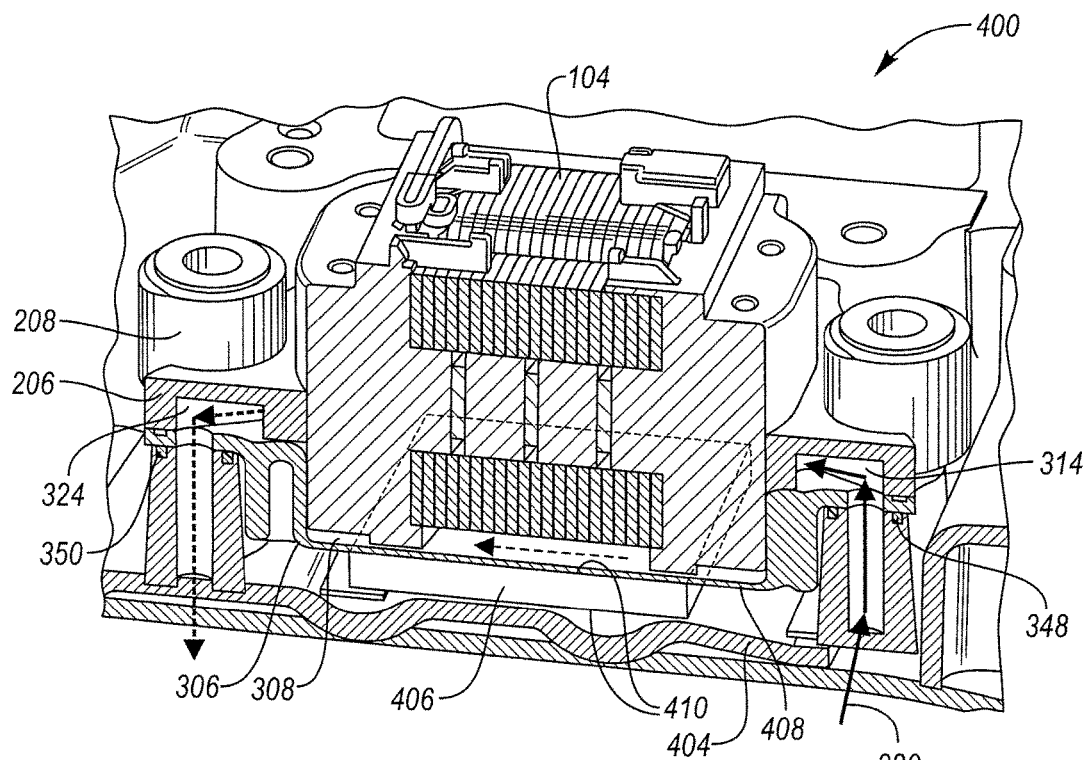
FIG. 16 is a cross-sectional view of an inductor cooling system with top and base portions assembled, according to an embodiment.

With reference to FIGS. 15-16, an embodiment of an inductor cooling system 400 is shown. FIG. 15 shows a bottom view of a top portion 402 of the system 400 that includes the inductor assembly 100. FIG. 15 shows a perspective sectioned view of the top portion 402 and a base portion 404 of the system 400 once they have been secured and installed. Elements common to systems 200, 300, and 400 have been numbered the same and may not be described again in detail. In the embodiment of system 400 shown, the system is substantially the same as the cooling system 300, described above, except for the addition of a thermal interface material (TIM) 406, described in additional detail below. However, it is to be understood that the components of system 400 need not be identical to those of system 300. One of ordinary skill in the art will understand, based on the present disclosure, that certain components of system 400 may be modified, rearranged, or omitted, or that additional components may be present.

With reference to FIGS. 15 a TIM 406 is shown disposed on a bottom surface 408 of the cover 306. The bottom surface 408 of the cover 306 may be generally parallel to the flange 206 and/or the wall/surface of the transmission case 212 to which the system 400 is attached. The bottom surface 408 may be generally flat/planar. In FIG. 16, the TIM 406 is shown disposed between the bottom surface 408 and a wall/surface of the transmission case 212. When the system 400 is assembled, the bottom surface 408, the wall of the transmission case 212, and opposing surfaces 410 of the TIM 406 may be generally parallel to each other. When the system 400 is assembled and in use, the TIM 406 may be in contact with the bottom surface 408 on one of the opposing surfaces 410 and the wall/surface of the transmission case 212 on the other of the opposing surfaces 410. The TIM 406 may thereby allow heat from the cover 306 to be transferred to the transmission case 212. The TIM 406 may be any thermally conductive material, for example, a material having a thermal conductivity of at least 10 $W \cdot m^{-1} \cdot K^{-1}$, at least 50 $W \cdot m^{-1} \cdot K^{-1}$, or at least 100 $W \cdot m^{-1} \cdot K^{-1}$. If not located in a transmission case, the TIM 406 may be in contact with a different thermally conductive surface instead of the transmission case (which may be metal).

The TIM 406 may be generally planar, as shown, with a relatively large length and width and a relatively small thickness. The TIM 406 is shown as a rectangular prism with a constant thickness, however, it may have any suitable shape or may be irregular. The TIM 406 may be a solid layer of material, for example, a metal (e.g., aluminum or copper) or a conductive polymer (e.g., a polymer composite). However, the TIM 406 may also be a high viscosity liquid or paste, for example a thermal grease. The term thermal grease may refer to a polymerizable liquid matrix that includes a thermally conductive filler. Example matrix materials may include epoxies, silicones, urethanes, or acrylates and example fillers may include aluminum oxide, boron nitride, or zinc oxide. Alternatives to a thermal grease may include thermal glue/adhesive, thermal gap filler, or a thermal pad.

The thickness of the TIM 406 may depend on the type of material used. For example, a thermal grease layer may be relatively thin, while a layer of metal (e.g., Al or Cu) or a thermal pad may be relatively thick. In one embodiment, the TIM 406 may have a thickness (e.g., the distance from the cover 306 to the transmission case 212) of 0.05 to 10 mm, or any sub-range therein. For example, if the TIM 406 is a thermal grease or other paste-like substance, the thickness may be from 0.05 to 2 mm, or any sub-range therein, such as 0.05 to 1 mm, 0.05 to 0.5 mm, 0.05 to 0.2 mm, or others. If the TIM 406 is a solid layer, the thickness may be from 0.5 to 10 mm, or any sub-range therein, such as 0.5 to 5 mm, 1 to 10 mm, 1 to 5 mm, or others. The TIM 406 may have a substantially constant thickness.

The TIM 406 (e.g., one of the surfaces 410) may cover or overly at least a portion of the bottom surface 408 of the cover 306. The coverage of the TIM 406 may depend on what type of material the TIM is made of. For example, a thermal grease or other paste-type substance may be applied to substantially the entire bottom surface 408 (e.g., at least 95%). A solid layer TIM may have a more geometric shape and may not cover as much area as a paste (although it may). In one embodiment, the TIM 406 may cover or overly at least 50% of the bottom surface 408 (e.g., by area), such as at least 60%, 70%, 75%, 80%, 85%, or 95% of the bottom surface 408. The surface 410 of the TIM 406 that contacts the transmission case may be substantially completely in contact with the transmission case (e.g., at least 95% or 100%).

As described above, the TIM 406 may contact both the bottom surface 408 of the cover 306 and a wall of the transmission case 212, thereby transferring heat from the former to the latter. If the wall of the transmission case 212 is not flat, the TIM 406 may conform to the wall such that the TIM 406 is in contact with the transmission case 212 across substantially its entire surface 410. If the TIM 406 is formed of a solid material, then it may be in a state of compression when the system 400 is assembled and secured to the transmission case 212. For example, a gap between the bottom surface 408 and the wall of the transmission case 212 may be smaller than an unconstrained thickness of the TIM 406. Accordingly, when the TIM 406 is inserted between the two components and the inductor assembly 100 is secured to the transmission case, the TIM 406 may be compressed and deformed. In one embodiment, the TIM 406 may be in a state of compression such that its average thickness when the system 400 is assembled is at least 1% smaller than when the system 400 is not assembled, for example, at least 5% or 10% smaller.

Accordingly, the cooling system 400 may include the cooling features of cooling system 300, plus additional cooling via the thermal interface material (TIM). When coolant, such as ATF or other coolants, is being pumped/circulated through the cavity 308, cooling of the inductor coils may occur as described above (e.g., the coolant absorbs heat from the coils and is carried away by the coolant flow). However, the coolant may not be pumped/circulated continuously at all times. For example, the coolant may only be pumped when the inductor is operating or when the vehicle is turned on (e.g., circulating mode). There may be times when the coolant is not pumping, in which case it may pool in the cavity 308 (e.g., pooling mode). Cooling of the inductor may still be desired when the coolant is not being circulated. In these situations, the system 400 may transfer more heat from the inductor than the system 300.

In embodiments where the cover 306 is formed of a thermally conductive material (e.g., at least 10, 50, or 100 $W \cdot m^{-1} \cdot K^{-1}$, such as a metal), the system 400 may provide a heat flow path from the inductor coils to the standing/pooled coolant in the cavity 308, to the cover 306, then to the TIM 406, and then to the transmission case 212. The transmission case 212, which is generally made of metal, may act as a heat sink to receive and dissipate heat energy from the inductor coils. Since the transmission case is generally large compared to the inductor coils (e.g., larger thermal mass and/or larger surface area), it may be able to dissipate the excess heat from the coils without significantly increasing in temperature. Accordingly, the system 400 may allow for passive cooling of the inductor coils when coolant is not being pumped through the cavity 308 (e.g., pooling mode). Some cooling may occur via this heat flow path while the coolant is being pumped/circulated, however, the moving coolant may not dwell in the cavity 308 long enough for significant cooling to occur.

Figure 17:
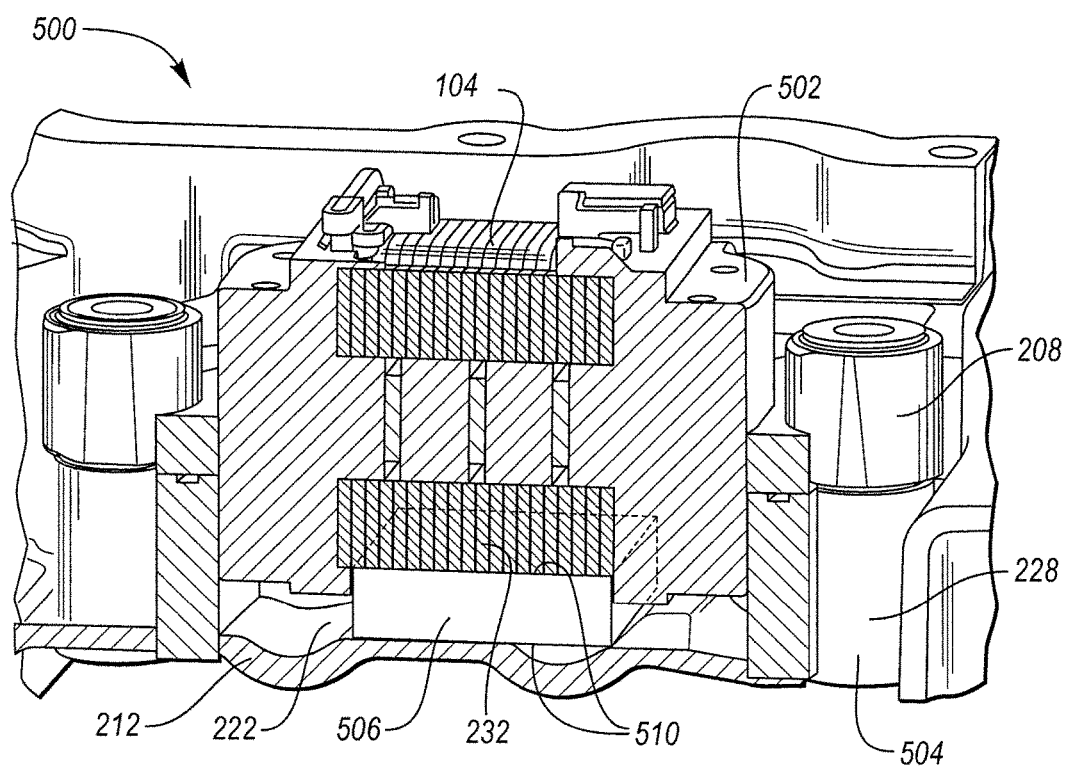
FIG. 17 is a cross-sectional view of another inductor cooling system with top and base portions assembled, according to an embodiment.

With reference to FIG. 17, an embodiment of an inductor cooling system 500 is shown. FIG. 17 shows a perspective sectioned view of the top portion 502 and a base portion 504 of the system 500 once they have been secured and installed. Elements common to systems 200, 300, and 400 have been numbered the same and may not be described again in detail. In the embodiment of system 500 shown, the system is substantially the same as the cooling system 200, described above, except for the absence of the coolant inlet and outlet and the addition of a thermal interface material (TIM) 506. However, it is to be understood that the components of system 500 need not be identical to those of system 200. One of ordinary skill in the art will understand, based on the present disclosure, that certain components of system 500 may be modified, rearranged, or omitted, or that additional components may be present.

The system 500 may not provide any coolant into the cavity 222 between the transmission case 212 and the inductor assembly 100 or flange 206. As described with respect to system 200, a bottom portion 232 of the conductor 102, shown as a pair of coils 104, of the inductor assembly 100 may be disposed within the cavity 222 when the system 200 is assembled. However, instead of a coolant being used to cool the bottom portion 232 of the coils 104, the TIM 506 may be used to remove the heat. The TIM 506 may be the same as described above with respect to TIM 406. For example, the TIM 506 may be a solid layer or a thermal paste. However, since the TIM 506 is in contact with the inductor coils, it may be formed of an electrically insulating material.

With the bottom portion 232 of the conductor 102 (e.g., coils 104) disposed within the cavity 222, the TIM 506 may be configured to directly contact the bottom of the coils, thereby absorbing heat from the coils and transferring it to the transmission case 212. The transmission case 212, which is generally made of metal, may act as a heat sink to receive and dissipate heat energy from the inductor coils directly via the TIM 506 (e.g., the heat passes from the coils to the TIM to the transmission case). Since the transmission case is generally large compared to the inductor coils (e.g., larger thermal mass and/or larger surface area), it may be able to dissipate the excess heat from the coils without significantly increasing in temperature. Accordingly, the system 500 may allow for passive cooling of the inductor coils without any liquid coolant being in direct contact with the inductor assembly (e.g., the coils or the core).

The TIM 506 may contact both the bottom portion 232 of the conductor 102 and a wall/surface of the transmission case 212, thereby transferring heat from the former to the latter. When the system 500 is assembled and in use, the TIM 506 may be in contact with the bottom portion 232 of the coils 104 on one of the opposing surfaces 510 and the wall/surface of the transmission case 212 on the other of the opposing surfaces 510. If the wall of the transmission case 212 is not flat, the TIM 506 may conform to the wall such that the TIM 506 is in contact with the transmission case 212 across substantially its entire surface 410. Similarly, the TIM 506 may conform to the bottom portion 232 of the coils 104. In at least one embodiment, the TIM 506 may be in contact with the bottom portion 232 of the coils 104 but may not be in contact with the core 106 of the inductor assembly 100. For example, the bottom portion 232 of the coils 104 may be the only portion of the inductor assembly 100 that is in contact with the TIM 506.

If the TIM 506 is formed of a solid material, then it may be in a state of compression when the system 500 is assembled and secured to the transmission case 212. For example, a gap between the bottom portion 232 of the coils 104 and the wall of the transmission case 212 may be smaller than an unconstrained thickness of the TIM 506. Accordingly, when the TIM 506 is inserted between the two components and the inductor assembly 100 is secured to the transmission case, the TIM 506 may be compressed and deformed. For example, the bottom portion 232 of the coils 104 may extend into and deform the TIM 506 (e.g., such that the TIM partially surrounds the bottom portion 232 of the coils 104). The TIM 506 may therefore penetrate any gaps between the coils (if present).

In one embodiment, the TIM 506 may be in a state of compression such that its average thickness when the system 500 is assembled is at least 1% smaller than when the system 500 is not assembled, for example, at least 5% or 10% smaller (e.g., compressed at least 1%, 5%, or 10%). Without being held to any particular theory, it is believed that the TIM may transfer heat energy more effectively when in a state of compression. In addition, placing the TIM in compression may ensure greater contact area between the bottom portion 232 of the coils 104 and the TIM and between the TIM and the transmission case.

The TIM 506 (e.g., one of the surfaces 410) may cover or overly at least a portion of the bottom portion 232 of the coils 104. The coverage of the TIM 506 may depend on what type of material the TIM is made of or the configuration of the coils. For example, a paste-type substance may be applied to substantially the entire bottom portion 232 of the coils 104 (e.g., at least 95%). A solid layer TIM may have a more geometric shape and may not cover as much area as a paste (although it may). In one embodiment, the TIM 506 may cover or overly at least 50% of the bottom portion 232 of the coils 104 (e.g., by the projected area of the coils), such as at least 60%, 70%, 75%, 80%, 85%, or 95% of the bottom portion 232 of the coils 104. In another embodiment, the TIM 506 may cover the entire bottom portion 232 of the coils 104 (e.g., by the projected area of the coils).

Accordingly, the cooling system 500 may provide passive cooling of the inductor without the direct use of liquid coolant on the coils. A thermal interface material (TIM) may be provided in contact with the inductor coils on one side and with the transmission case on an opposing side. The TIM may absorb heat energy from the inductor coils and transfer it to the transmission case, which may then dissipate the heat. Additional cooling may be provided by splashing of coolant onto the wall of the transmission case that is opposite the TIM, thereby absorbing some of the heat energy from the transmission case. The splashing may be passive (e.g., unintentional or occurs during regular operation of the transmission) or it may be active, wherein coolant may be intentionally directed to the wall of the transmission case (e.g., by spraying, placement of components, etc.). Passive splashing may take advantage of the known configuration and operation of the gears in the transmission case. The splash patterns of the coolant may be analyzed and the cooling system 500 may be arranged to receive the splashed coolant. Active splashing may include providing oil ports in the transmission case and pumping coolant to the location of the cooling system 500.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a transmission case including a coolant inlet;
   an inductor assembly having a flange extending continuously around a periphery thereof;
   a thermally conductive cover having a sealing surface forming a seal with the flange and defining a cavity to house half of a volume of the inductor assembly;
   a cavity defined between the cover and the inductor assembly and configured to receive coolant from the coolant inlet; and
   a thermal interface material in contact with a surface of the cover and a surface of the transmission case.

2. The vehicle of claim 1, wherein the thermal interface material is a solid layer having a thermal conductivity of at least 10 $W \cdot m^{-1} \cdot K^{-1}$.

3. The vehicle of claim 2, wherein the thermal interface material is formed of a metal or a thermally conductive polymer.

4. The vehicle of claim 2, wherein the thermal interface material has a thickness of 0.5 to 10 mm.

5. The vehicle of claim 2, wherein a first surface of the thermal interface material contacts a bottom surface of the cover over at least 75% of a surface area of the bottom surface.

6. The vehicle of claim 5, wherein at least 95%, by area, of a second surface of the thermal interface material is in contact with the surface of the transmission case.

7. The vehicle of claim 2, wherein the solid layer is in a state of compression between the surface of the cover and the surface of the transmission case.

8. The vehicle of claim 1, wherein the thermal interface material is a layer of thermally conductive paste having a thermal conductivity of at least 10 $W \cdot m^{-1} \cdot K^{-1}$.

9. The vehicle of claim 8, wherein the thermally conductive paste contacts a bottom surface of the cover over at least 95% of a surface area of the bottom surface.

10. The vehicle of claim 8, wherein the thermally conductive paste has a thickness of 0.05 to 1 mm.

11. The vehicle of claim 1, wherein the thermally conductive cover has a thermal conductivity of at least 10 $W \cdot m^{-1} \cdot K^{-1}$.

12. The vehicle of claim 1, wherein the thermally conductive cover is a metal cover.

13. The vehicle of claim 1, wherein the thermal interface material is configured to transfer heat from the thermally conductive cover to the surface of the transmission case.

14. A vehicle, comprising:
    a transmission case including a coolant inlet;
    an inductor assembly;
    a thermally conductive cover sealed around an inductor assembly periphery at a flange extending continuously about the inductor assembly and defining a cavity sized to receive a portion of the inductor assembly and to receive coolant from the coolant inlet; and
    a compressed solid thermal interface material in contact with a cover bottom surface and a transmission case surface.

15. The vehicle of claim 14, wherein the thermally conductive cover is formed of metal and the compressed solid thermal interface material is formed of an electrically insulating material.

16. The vehicle of claim 14, wherein a first surface of the compressed solid thermal interface material contacts the cover bottom surface over at least 75% of a surface area of the bottom surface.

17. The vehicle of claim 14, wherein the thermal interface material is formed of a thermally conductive polymer.

* * * * *